United States Patent
Shi et al.

(10) Patent No.: US 6,615,600 B2
(45) Date of Patent: Sep. 9, 2003

(54) CONTROLLING APPARATUS AND CONTROLLING METHOD FOR MODE CHANGE TYPE REFRIGERATING SYSTEM

(75) Inventors: Yongwei Shi, Chiba (JP); Akira Shimada, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 10/039,294

(22) Filed: Nov. 9, 2001

(65) Prior Publication Data

US 2002/0088240 A1 Jul. 11, 2002

(51) Int. Cl.$^7$ .......................... F25D 17/00; F25B 41/00
(52) U.S. Cl. ......................... 62/228.3; 62/229
(58) Field of Search ............................ 62/228.3, 228.4, 62/229, 180

(56) References Cited

U.S. PATENT DOCUMENTS 5,436,547 A * 7/1995 Nagai et al. .................. 62/151
5,950,443 A * 9/1999 Meyer et al. ........... 62/228.4 X

* cited by examiner

Primary Examiner—William Wayner
(74) Attorney, Agent, or Firm—Adams & Wilks

(57) ABSTRACT

The present invention provides a controlling apparatus and a controlling method for a mode change type refrigerating system allowing the most appropriate temperature control even with respect to various heating loads. When a person sets a target temperature setter and a fan setter in a motor vehicle as desired, a unit to be connected with a mode change condition circuit 101 is determined from among control units and from among calculation units of speed revision. A capacity control instruction value (Duty 1) calculated by controlling a temperature and a capacity control instruction value (Duty 2) calculated by revising a speed are added, then the capacity of a variable capacity type gas compressor is controlled with reference to a capacity control instruction value (Duty 3) as the added signal.

6 Claims, 8 Drawing Sheets

CONTROLLING APPARATUS AND CONTROLLING METHOD FOR MODE CHANGE TYPE REFRIGERATING SYSTEM

BACKGROUND OF THE INVENTION

1. Field of the Invention

The present invention relates to a controlling apparatus and a controlling method for a mode change type refrigerating system, particularly, to the controlling apparatus and the controlling method for the mode change type refrigerating system allowing the most appropriate temperature control even with respect to various heating loads.

2. Description of the Related Art

FIG. 4 is a diagram showing the schematic configuration of the whole of an air-conditioning system. The air-conditioning system is mounted, for example, on a motor vehicle. As shown in FIG. 4, an evaporator 51 cools the room air of the motor vehicle when a fan 52 is blowing. A variable capacity type gas compressor 10 compresses refrigerant gas to a condenser 53.

When the refrigerant gas is liquefied, the condenser 53 emits the heat absorbed from inside the motor vehicle to outside of the motor vehicle. An expansion valve 54 rapidly reduces pressure of refrigerant gas from high pressure to low pressure. Since shaft power of an engine 59 is transferred to a rotating shaft 11 of the variable capacity type gas compressor 10 via a belt 63, the rotating shaft 11 is rotatably driven.

FIG. 5 is a sectional view showing the variable capacity type gas compressor 10. FIG. 6 is a sectional view showing the variable capacity type gas compressor 10 taken along the 6—6 line in FIG. 5. An inlet 1 of the variable capacity type gas compressor 10 intakes refrigerant gas from the evaporator 51 externally connected therewith. A cylinder 3 is inserted between a front head 5 and a rear side block 7. A rotor 9 is rotatably provided in the cylinder 3.

The rotor 9 is fixed through the rotating shaft 11. On the periphery of the rotor 9, vane grooves 13 are formed in a radial direction. Vanes 15 are slidably provided in the vane grooves 13. When the rotor 9 rotates, the vanes 15 are biased toward an inner wall of the cylinder 3 due to centrifugal force of the rotor 9 and oil pressure of the bottom section of the vane grooves 13.

The cylinder 3 is divided into a plurality of small chambers by means of the rotor 9, the vanes 15, 15 . . . . These small chambers are referred to as compression chambers 17, 17 . . . . The capacity of the compression chambers 17, 17 . . . alternately increases and decreases in accordance with rotation of the rotor 9.

When the capacity of the compression chambers 17, 17 . . . is changed with rotation of the rotor 9, low pressure refrigerant gas is drawn in through the inlet 1 and compressed due to the change in the capacity. A case 19 is fixed on the surrounding end portion of the cylinder 3 and the surrounding end portion of the rear side block 7. A discharge chamber 21 is formed inside this case 19.

The high pressure refrigerant gas compressed at the compression chamber 17 is delivered into the discharge chamber 21 through a discharge port 23 and a discharge valve 25. Further, the refrigerant gas is delivered into the condenser 53 via a discharge opening 27 from the discharge chamber 21.

The variable capacity type gas compressor 10 is provided with a variable capacity mechanism 30. The variable capacity mechanism 30 makes it possible to make the discharge capacity of the refrigerant gas variable by the room temperature of the motor vehicle. FIG. 7 shows an example of the configuration of the variable capacity mechanism 30.

A control board 29 is provided in the front head 5 facing the side portion of the cylinder 3. The control board 29 includes two notches 29a. These notches 29a allow the interior of the cylinder 3 and an inhalation chamber 31 connecting to the inlet 1 to be communicated with each other. On the other hand, the compression chamber 17 is formed at the portion without the notch on the control board 29, that is, the space closed by the inner wall of the cylinder 3 and the vanes 15.

When the control board 29 is rotated to the right, the notches 29a are also rotated to the right, so the position where the compression chamber 17 is formed also moves to the right side. At this time, the capacity of the compression chamber 17 is accordingly reduced. In this way, the discharge volume is adjustable by rotating the control board 29.

A driving shaft 39 for driving oil pressure performs a rotation of the control board 29 via a pin 33. By adjusting the opening of a control valve 37, oil is poured into a sleeve 35 from the discharge chamber 21. The driving shaft 39 is moved forthrightly by the oil pressure due to the oil pressure generated at this time. This forthright motion of the driving shaft 39 is transformed into a rotary motion via the pin 33 to rotate the control board 29. The injection volume of oil is adjustable by changing the opening of the control valve 37. This adjustment of opening of the control valve 37 is implemented by changing a capacity control instruction value (duty ratio) shown in FIG. 8. Then the control board 29 is rotated in proportion to elastic force by a spring 38, according to a pressure difference between control pressure $P_c$ in the sleeve 35 and pressure $P_s$ in the inhalation room 31.

In FIG. 4, a temperature sensor 55 is provided, for example to detect air temperature of an exit of the evaporator 51. A rotating speed sensor 57 is provided to detect rotating speed of an engine 59.

A control circuit 61 calculates the capacity control instruction value based on the detecting signal of this temperature sensor 55 and the rotating speed of the engine 59. An occurrence circuit of capacity control signal 65 amplifies the signal of the capacity control instruction value to transfer it to the control valve 37 of the variable capacity mechanism 30.

The controlling method of this variable capacity mechanism 30 will be described with reference to a flowchart shown in FIG. 9. To simply describe the mechanism, the example given below refers to the case where the capacity of the variable capacity type gas compressor 10 is reduced when, for example, the rotating speed of the engine 59 is increased.

Here, it is assumed that a detected temperature of the exit of the evaporator 51 is lower than a target temperature 67 of the exit of the evaporator 51. In this case, cooling capacity of the motor vehicle has to be lowered to prevent the room temperature of the motor vehicle from dropping excessively.

First, at step 1 (hereinafter abbreviated as "S1" in the drawing), the target flow rate of refrigerant of the variable capacity type gas compressor 10 is calculated based on a temperature deviation between target temperature and the detected temperature. PID control or the like is applied to this calculation.

At step 3, the discharge volume of the variable capacity type gas compressor 10 is calculated from this calculated target flow rate of refrigerant, taking into consideration the rotating speed of the variable capacity type gas compressor 10 or the rotating speed of the engine 59.

At step 5, a calculation of rotating speed revision is performed from this discharge volume, based on a characteristic curve representing the relation between the discharge volume and the capacity control instruction value (not shown). The capacity control instruction value for the opening of the control valve 37 to be adjusted is determined by this calculation. In this case, the capacity control instruction value is small. As a result, at step 7, an average current becomes smaller. Then at step 9, the opening of the control valve 37 becomes smaller.

At this time, at step 11, the control pressure $P_C$ in the sleeve 35 becomes smaller. Therefore, at step 13, the driving shaft 39 moves downward. At step 15, the control board 29 rotates in the right-hand direction. As a result, at step 17, the discharge volume of the variable capacity type gas compressor 10 becomes smaller, and the cooling capacity is lowered.

However, each of the PID control constants is restricted to one kind of setting. The characteristic curve applied to the calculation of rotating speed revision is also restricted to a fixed characteristic curve. On the other hand, various kinds of heating loads may be present in the refrigerating system (for example, in the case where the refrigerating system is carried on a motor vehicle, the heating load varies depending on the season.) Further, the characteristic curve is not linear.

Therefore, there are fears in that the system may be unable to obtain the optimum control performance within a controlling range, or the system may be unable to execute its control depending on the condition. As a result, the controllable range becomes narrow accordingly.

SUMMARY OF THE INVENTION

The present invention is devised for solving the above-described problems. An object of the present invention is to provide a controlling apparatus and a controlling method for a mode change type refrigerating system allowing the most appropriate temperature control even with respect to various heating loads.

The present invention is comprised of: a variable capacity type gas compressor having a capacity changing means capable of changing a capacity of a compression chamber; and a evaporator for delivering refrigerant drawn into the variable capacity type gas compressor; a fan for cooling the evaporator; a temperature detecting means for detecting air temperature at a predetermined place desired for controlling temperature; a temperature setting means for setting the target temperature; a deviation calculating means for calculating deviation between the temperature setting means and the temperature detecting means; a temperature controlling means provided with a plurality of control units, each of the control units commonly including a plurality of control elements, in which at least one control element among the plurality of the control elements has a control unit and a first capacity control value is outputted as the result of the calculation based on the control element; a control unit selecting means for selecting one control unit from among the plural control units, and for inputting the deviation calculated by the deviation calculating means to the selected control unit; a means for detecting a number of rotation for detecting the number of rotation of the variable capacity type gas compressor or the number of rotation of a driving apparatus for driving the variable capacity type gas compressor; air flow amount setting means for setting the air flow amount of the fan; a calculation means of speed revision provided with a plurality of calculation units of speed revision having mutually different speed revision characteristics and for outputting a second capacity control value as the result of the calculation; a selecting means of calculation unit of speed revision for selecting one calculation unit of speed revision from among the plural calculation units of speed revision, and for inputting the number of rotation detected by the means for detecting a number of rotation to the calculation unit of speed revision thus selected; a mode changing means for changing the control unit in the control unit selecting means and/or for changing the calculation unit of speed revision in the selecting means of calculation unit of speed revision based on the target temperature set by the temperature setting means and the air flow amount set by the air flow amount setting means; and an adding means for adding the first capacity control value and the second capacity control value and for outputting the added value to the capacity changing means.

The variable capacity type gas compressor can change a capacity of the compression chamber by a capacity changing means. The deviation calculating means calculates the deviation between the target temperature set by the temperature setting means and the air temperature detected by the temperature detecting means. The temperature controlling means is provided with a plurality of control units. Each of the plural control units has plural control elements. For example, each element of PID or a filter and the like are included in the control elements.

These control elements correspond to each of the control units, and are commonly applied to each of the plurality of control units. However, at least one control element among the plural control elements has a control element value that is different for each control. For example, when each of the control units commonly include each element of PID or a filter, parameter values such as the gain for the proportional element or filter constant are made to be different for each control unit.

Each of the control element values is calculated in advance by experiments and the like by being made to correspond to each range of the predetermined heating loads, and then each of the control element values is set. The range of each of the heating loads is determined in accordance with the number of the control units. The range of each heating load may be different from or partly overlapped with each other. However, it needs to be so set that the whole controlling area be covered by composing each of the ranges of heating loads.

The control unit selecting means selects one control unit from among a plurality of control units. The deviation calculated by the deviation calculating means is input to this selected control unit. The calculated result is output as the first capacity control value.

The means for detecting the number of rotation detects the number of rotation of the variable capacity type gas compressor or the number of rotation of the driving apparatus for driving the variable capacity type gas compressor. The air flow amount setting means sets the air flow amount of the fan. The air flow amount of the fan may be set step by step, or may be continuously set. However, in the case where the flow amount of the fan is continuously set, it has to be translated to a step-wise value.

Each of the calculation units of speed revision has a different speed revision characteristic. The selecting means of calculation unit of speed revision selects one calculation unit of speed revision from among the plural calculation units of speed revision. The number of rotation detected by the means for detecting the number of rotation is input to this selected calculation unit of speed revision. The calculated result is output as the second capacity control value. The mode changing means performs changing of control units in the control unit selecting means based on the target temperature set by the temperature setting means and the air flow amount set by the air flow amount setting means. Which of the control units is to be made to correspond to or changed over based on a specific target temperature and the target air flow amount is determined in advance by experiments or the like.

This mode changing means also performs changing of calculation units of speed revision in the selecting means of calculation unit of speed revision, similarly based on the target temperature set by the temperature setting means and the air flow amount set by the air flow amount setting means. Which of the calculation units of speed revision is to be made to correspond to or changed over based on a specific target temperature and target air flow amount is determined in advance by experiments or the like.

The adding means adds the first capacity control value and the second capacity control value, and then outputs the added value to the capacity changing means.

As described above, the present invention enables optimum temperature control even with respect to various heating loads. Further, in this case, each setting is made based on judgements by a person. Therefore, it is possible to perform the most appropriate control which corresponds with the actual feeling physically experienced by each person.

Further, the present invention is characterized in that the speed revision characteristic can be represented by using the formula on the relation between the second capacity control value and the number of rotation: capacity control value= a×(number of rotation)$^b$ (a and b are real numbers.)

According to this formula, even when the rotating speed of the engine or the rotating speed of the gas compressor are changed, the optimum speed revision can be performed in order to rapidly focus on the target temperature.

The temperature detecting means of the present invention uses a thermistor, although a thermocouple or the like can also be employed for the temperature detecting means. The present invention is characterized in that the air temperature $T_s$ is calculated by the following relation formula using an output voltage $T_{sv}$ of the thermistor: $T_s=c \times T_{sv}+d$ (c and d are real numbers.)

The air temperature $T_s$ is accurately calculated by this relation formula.

Further, the present invention is characterized by comprising a pressure detecting means for detecting the refrigerant pressure instead of the temperature detecting means, and a pressure setting means for setting a target pressure instead of the temperature setting means. The present invention is also characterized in that the mode changing means changes the mode based on the target pressure set by the pressure setting means and the air flow amount set by the wind flow amount setting means.

The present invention relates to a controlling method for the mode change type refrigerating system using a controlling apparatus for the mode change type refrigerating system, the controlling apparatus being comprised of: the variable capacity type gas compressor having a capacity changing means capable of changing a capacity of a compression chamber; and a evaporator for delivering refrigerant inhaled into the variable capacity type gas compressor; a fan for cooling the evaporator; air flow amount setting means for setting the air flow amount of the fan; a plurality of control units having plural control elements commonly included therein, in which at least one control element among the plural control elements has a control element value that is different for each control unit; a plurality of calculation units of speed revision having mutually different revision characteristics; and a means for detecting the number of rotation for detecting the number of rotation of the variable capacity type gas compressor or the number of rotation of a driving apparatus for driving the variable capacity type gas compressor, characterized in that the controlling method for the mode change type refrigerating system comprises the steps of: detecting the air temperature at a predetermined place desired for controlling temperature; calculating the deviation between the air temperature and the set target temperature; selecting one control unit form among the plural control units based on the target temperature and the air flow amount set by the air flow amount setting means; inputting the deviation to the control unit; outputting the first capacity control value obtained by the calculation; selecting one calculation unit of speed revision from among the plural calculation units of speed revision based on the target temperature and the air flow amount set by the air flow amount setting means; inputting the number of rotation detected by the means for detecting the number of rotation into the calculation unit of speed revision thus selected; outputting a second capacity control value obtained by the calculation; adding the second capacity control value and the first capacity control value; and changing the capacity of the compression chamber based on the added value.

DESCRIPTION OF THE PREFERRED EMBODIMENT

Figure 1:
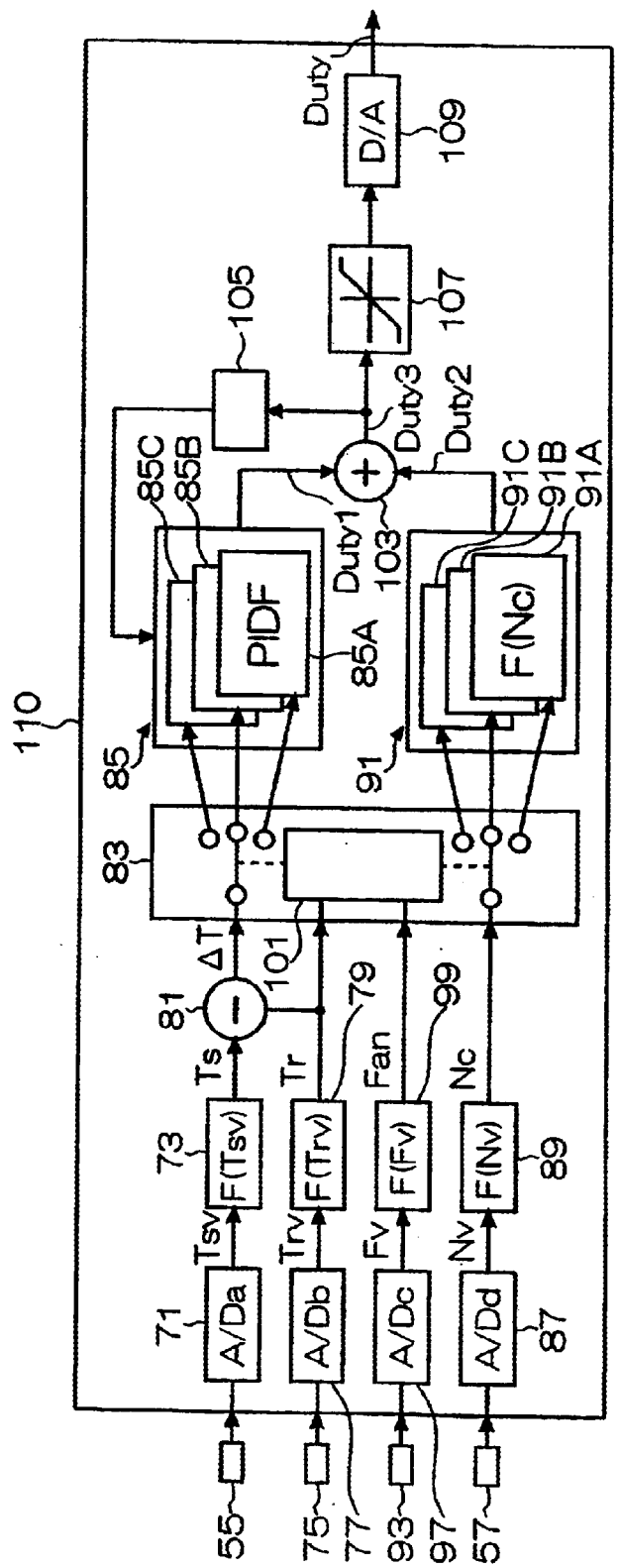
FIG. 1 is a block diagram showing embodiment 1 of the present invention.
Figure 2:
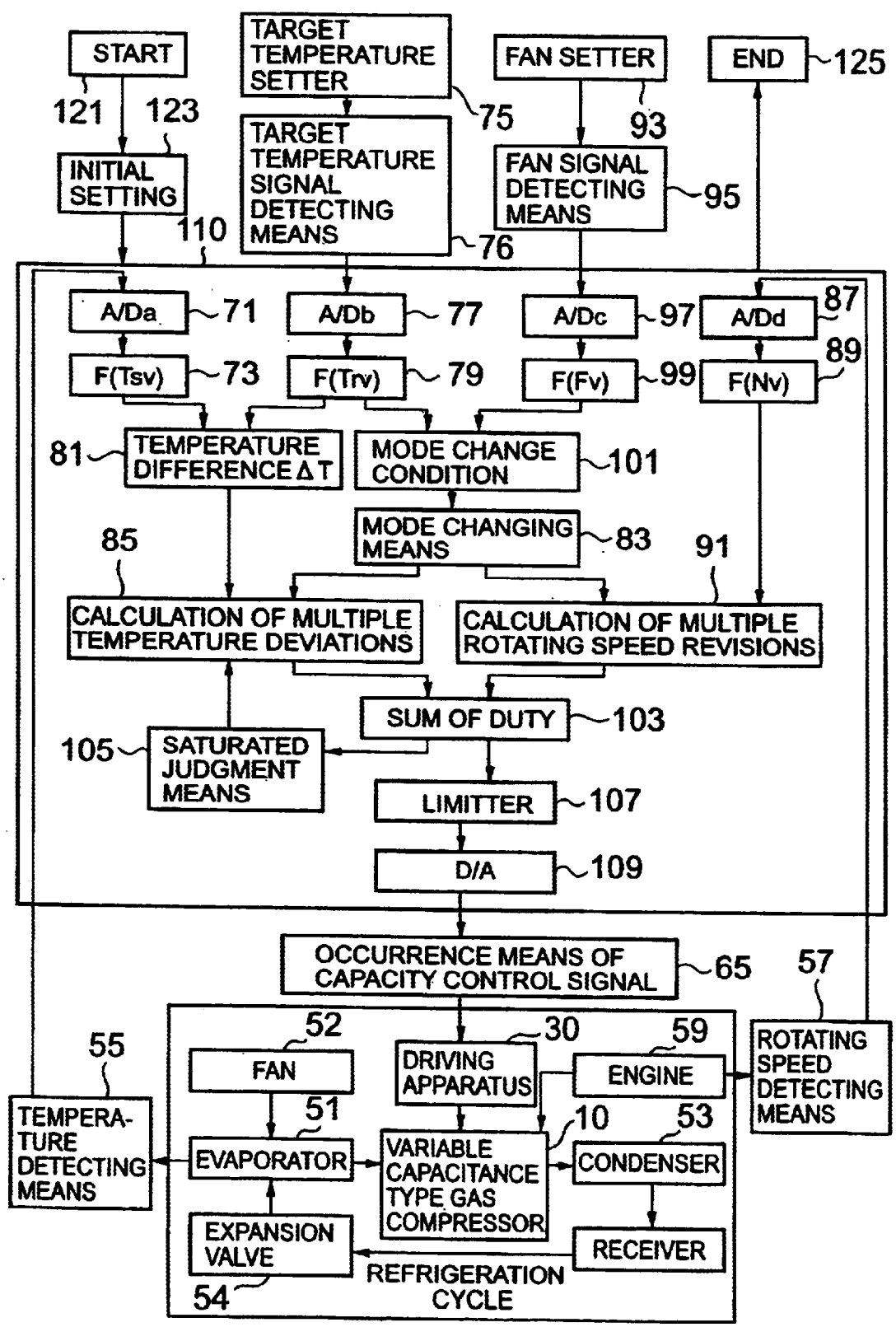
FIG. 2 is a flowchart which also included a refrigerant cycle.

Embodiment 1 of the present invention will be described hereinbelow. FIG. 1 is a block diagram showing Embodiment 1 of the present invention. FIG. 2 is a flowchart including a refrigerating cycle as well. A temperature sensor 55 in FIGS. 1 and 2 is provided at an exit of the evaporator 51.

An A/D converter 71 transforms the temperature detected by the temperature sensor 55 into digital information. A practical temperature changer 73 changes the digitalized temperature into the practical temperature. When the temperature sensor 55 is composed of a thermistor, the practical temperature $T_s$ is calculated from the detected output voltage $T_{sv}$ with the following relation formula: $T_s=c \times T_{sv}+d$ (c and d are real numbers.) However, the temperature sensor 55 can also consists of a themocouple.

A target temperature setter 75 is a pushing-button switch comprised of three levels such as strong cooling, medium cooling, and weak cooling. A target temperature signal detection circuit 76 converts an output signal of this target temperature setter 75 into a voltage value, and then outputs the voltage value. An A/D converter 77 converts the voltage value into a digital data, and a target temperature changer 79 changes the digital value into a target temperature $T_r$.

A subtracter 81 subtracts the practical temperature $T_s$ from the target temperature $T_r$, thereby calculating the deviation between the practical temperature and the target temperature. A control portion 85 is composed of three control units such as 85A, 85B, and 85C. Each of the control units 85A, 85B, and 85C includes a common set of control elements composed of PID (proportional element, integral element, differential element) and a filter constant F of low-pass filter.

However, the parameter value of the control element corresponding to each of the control units 85A, 85B, and 85C is set entirely or partially different. The deviation of the temperature is input to one of the control units 85A, 85B, and 85C selected by a mode changer 83. The deviation of the temperature is compensated for at the control unit, and an instruction value for controlling capacity Duty 1 is output therefrom.

On the other hand, a fan setter 93 is a push-button switch having three modes such as strong air, medium air, and weak air. A fan signal detection circuit 95 converts an output signal of this fan setter 93 into a voltage value, and then outputs the voltage value.

An A/D converter 97 converts the voltage value into a digital data, and a fan condition changer 99 changes the digital value into a Fan signal. The Fan signal shows a fan condition being currently set. The Fan signal shows which one is being selected from among the three modes of strong air, medium air, and weak air.

The rotating speed of the engine 59 is detected by the rotating speed sensor 57. However, the rotating speed of the variable capacity type gas compressor 10 may be used instead for detecting the rotating speed of the engine 59. An A/D converter 87 converts the rotating speed of the engine 59 into a digital information, and then a rotating speed changer 89 changes the digital information into a rotating speed $N_c$.

A calculation part of speed revision 91 is composed of three calculation units of speed revision 91A, 91B, and 91C. Each of the calculation units of speed revision 91A, 91B, and 91C stores a speed revision characteristic.

The speed revision characteristic shows the following formula: capacity control value=a×(number of rotation)$^b$ (a and b are real numbers.) When the detected number of rotation is applied to this formula, the capacity control value can be calculated. The calculation units of speed revision 91A, 91B, and 91C have mutually different values of a and b.

The rotating speed $N_c$ is input to one of the calculation units of speed revision selected by the mode changer 83 from among the calculation units of speed revision 91A, 91B, and 91C. The calculation unit of speed revision outputs a capacity control instruction value Duty 2.

Changing of control units among the control units 85A, 85B, and 85C, as well as changing among the calculation units of speed revision 91A, 91B and 91C are effected when the units that are judged to be connected to a mode change condition circuit 105 based on the target temperature Tr and the Fan signal are actually connected to the mode condition circuit 105.

An adder 103 adds up the capacity control instruction value Duty 1 and the capacity control instruction value Duty 2. A saturated judgment circuit 105 determines whether this added signal Duty 3 is saturated. When judged saturated, the Duty 3 is returned to the control portion 85 in order to terminate the differential calculation.

On the other hand, a limitter 107 limits an amplitude of the added signal Duty 3, and then a D/A converter 109 executes digital/analogue conversion with respect to the added signal Duty 3. That is, a computer implements a digital calculation processing with respect to an area 110 enclosed by a rectangular frame in FIGS. 1 and 2. Note that, however, respective portions can be composed of analogue devices.

The output signal of the D/A converter 109 is input to the occurrence circuit of capacity control signal 65. At step 121 of "start", an engine of a motor vehicle is started. At step 123 of "initial setting", as an example of the initial setting, the fan setter 93 or the target temperature setter 75 are set to the setting at the time when the engine of the motor vehicle is stopped. At step 125 of "end", the engine of the motor vehicle is stopped.

Next, the operation of Embodiment 1 of the present invention will be described. For example, when a room temperature of a motor vehicle is controlled, a heating load varies depending on the season or humidity. For obtaining such heating load by a calculation or the like, a sensor for detecting an outdoor air temperature or the like has to be provided separately, or a complex calculation processing must be carried out.

The present invention can deal with various heating loads without installing such another sensor or implementing such a complex calculation processing. Further, there may be a case where each person may feel differently about the room temperature in a motor vehicle. Therefore, first, a person selects one of strong cooling, medium cooling, and weak cooling with the target temperature setting 75 based on his or her judgement of the room temperature, and then selects one of strong air, medium air, and weak air with the fan setter 93.

In order to cover a wide range of the heating load, the three control units 85A, 85B, and 85C are provided having mutually different parameter values for common control elements. Similarly, the three calculation units of speed revision 91A, 91B, and 91C having mutually different speed revision characteristics are provided.

That is, each of these units covers the range selected by the target temperature setter 75 and the fan setter 93. The parameter value and the characteristic allowing the most appropriate control within this range are determined in advance by experiments. However, the number of modes for the setting of the target temperature, and that of the fan, the number of the units in the control portion 85, the number of the units in the calculation part of speed revision 91 and the like are not restricted to three modes (three). Any number of modes is possible.

When a person sets the target temperature setter 75 and the fan setter 93 in a motor vehicle as desired, a unit to be connected with the mode change condition circuit 101 is determined from among the control units 85A, 85B, and 85C, and from among the calculation units of speed revision 91A, 91B, and 91C. That is, fine control can be implemented by means of possible nine different combinations in total, three for the control unit, and three for the calculation unit of speed revision.

The capacity control instruction value Duty 1 calculated by controlling the temperature and the capacity control instruction value Duty 2 calculated by revising the speed are added, and then the capacity of the variable capacity type gas compressor 10 is controlled based on the capacity control instruction value Duty 3 as the added signal.

As described above, even if an air-conditioning apparatus such as a motor-vehicle-mounted one has to deal with various heating loads or the speed revision characteristic thereof is not linear, the present invention can implement the most appropriate control corresponding to the respective heating loads or the respective speed revision characteristics. As a result, the optimum controlling performance can be obtained over a wide controlling range.

That is, even when the rotating speed of the engine 59 or the variable capacity type gas compressor 10 is changed, the calculation part of speed revision 91 can quickly revise the capacity control instruction value. Thus, the air temperature at the exit of the evaporator 51 shows no change or shows just a minor change. Therefore, the air temperature at the exit of the evaporator 51 is kept to the target temperature.

The temperature sensor 55 employs a thermistor, and the practical temperature $T_s$ is calculated from the output voltage $T_{sv}$ of the thermistor. Therefore, the practical temperature $T_s$ can be accurately calculated. Further, the air temperature at the exit of the evaporator 51 can be precisely controlled. Note that a and b in the calculation formula are calculated in advance by experiments or the like.

By implementing this temperature controlling, since the air temperature at the exit of the evaporator 51 is kept at an appropriate temperature, such a phenomenon as freezing or the like does not occur at the exit of the evaporator 51.

Note that, in addition to the above-described vane rotary type, the so-called swash plate type or the scroll type can be similarly adopted for the variable capacity type gas compressor 10 in carrying out the present invention.

Figure 3:
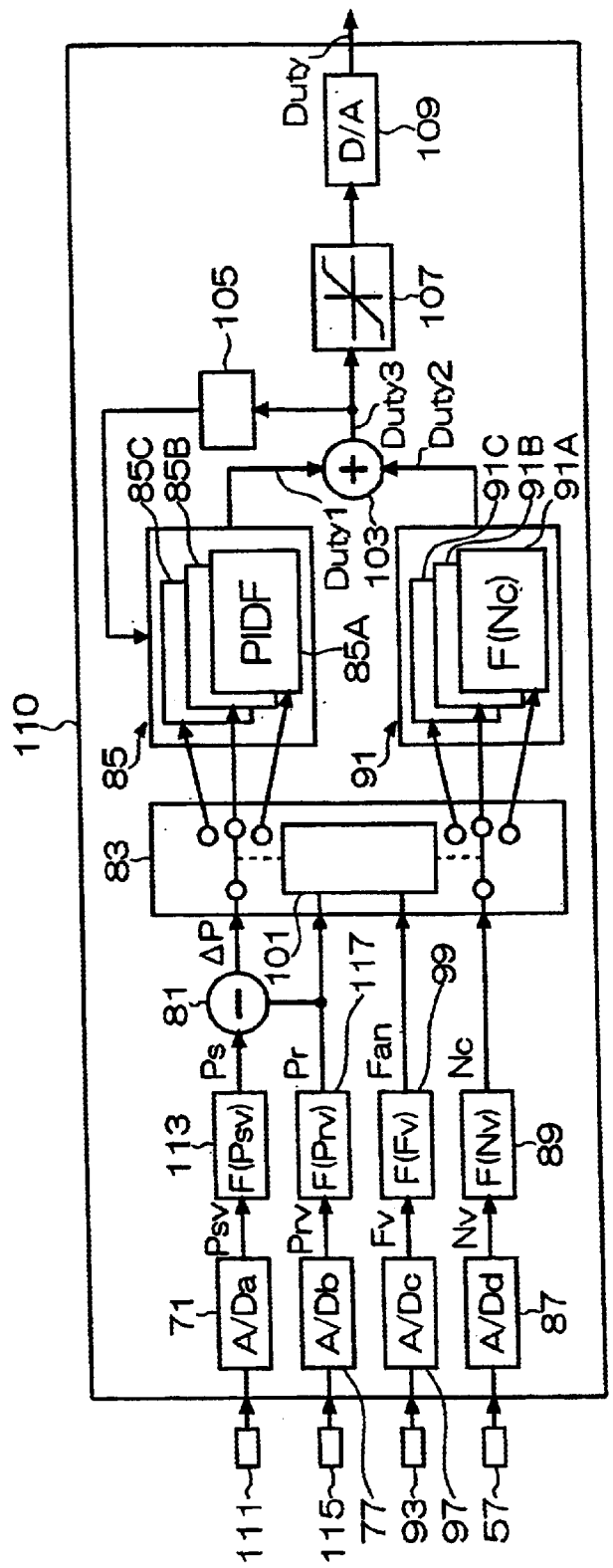
FIG. 3 is a block diagram showing embodiment 2 of the present invention.
Figure 4:
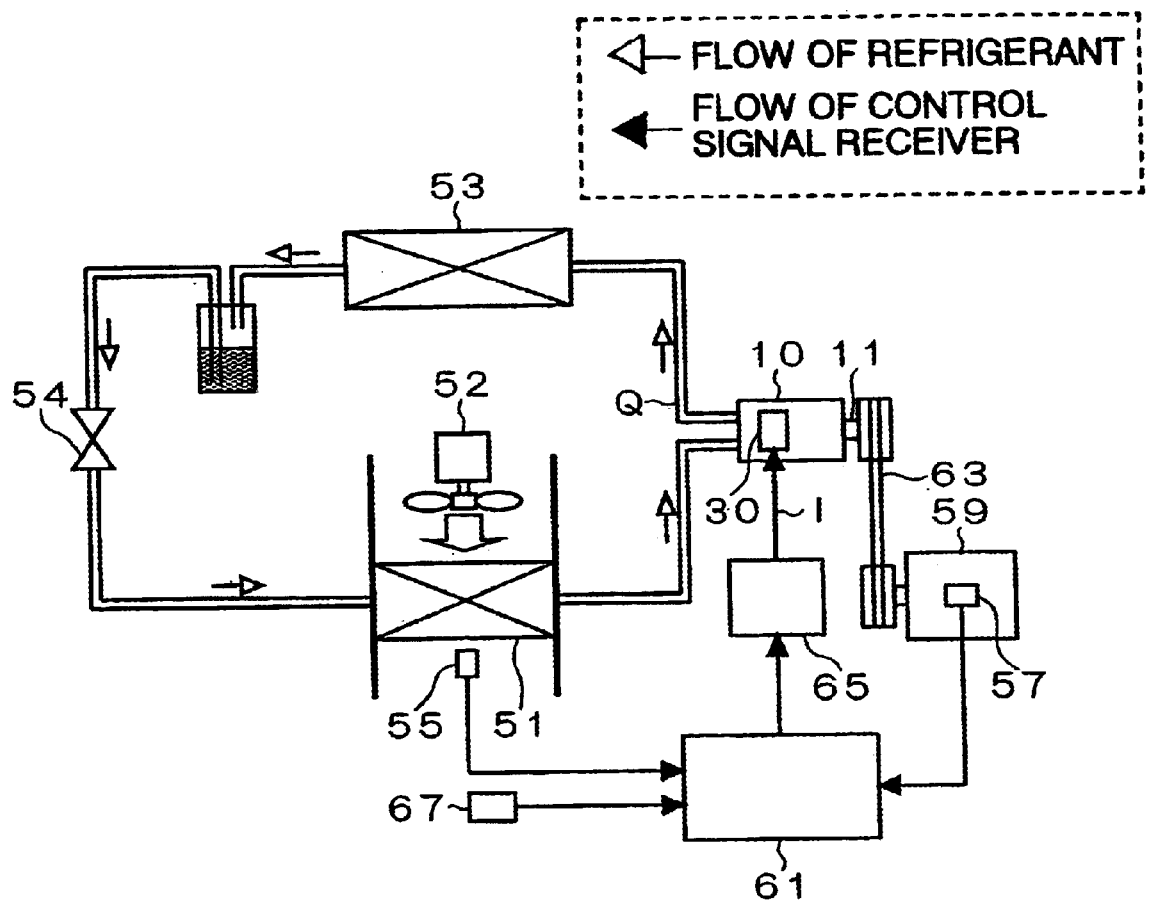
FIG. 4 is a diagram showing a schematic configuration of the whole of the air conditioning system.
Figure 5:
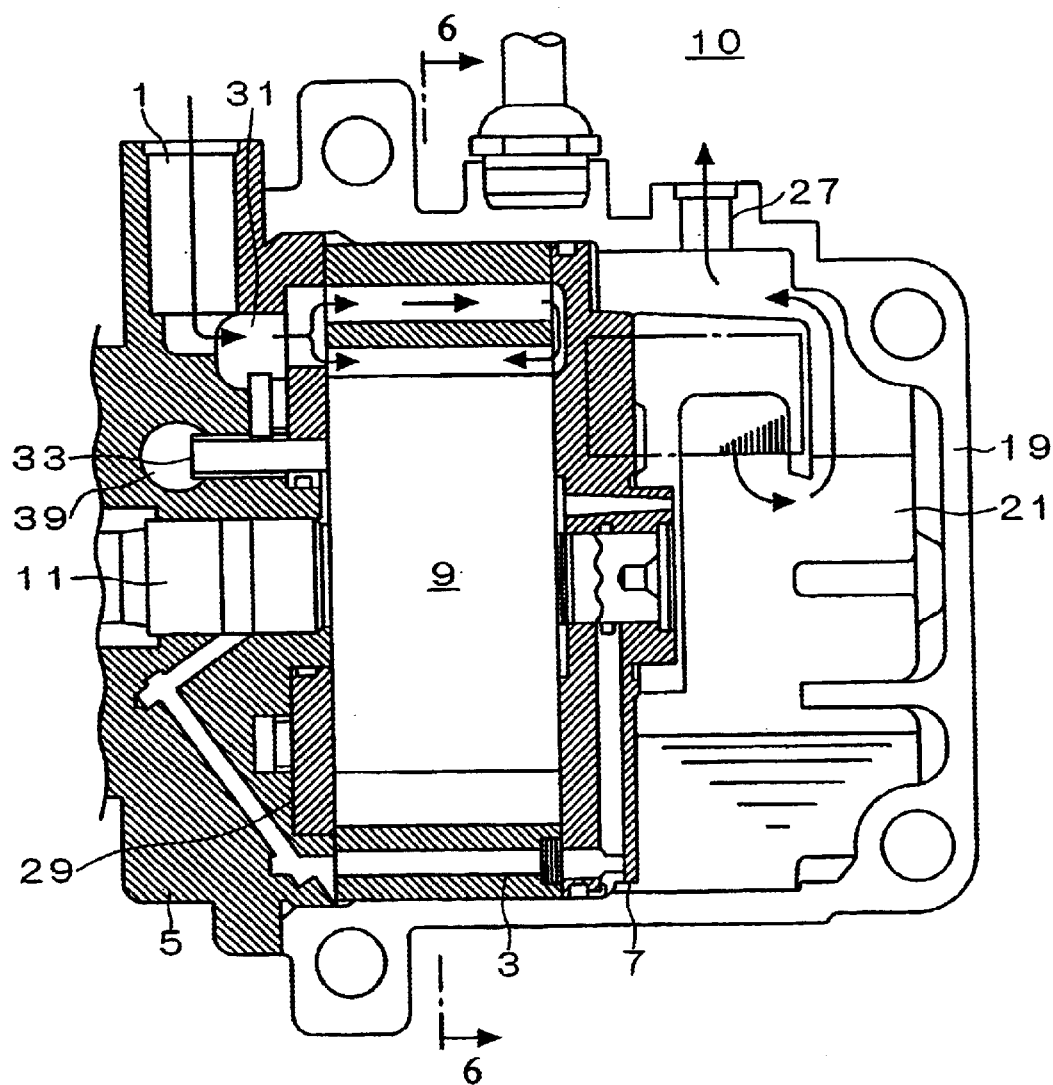
FIG. 5 is a sectional view showing the variable capacity type gas compressor.
Figure 6:
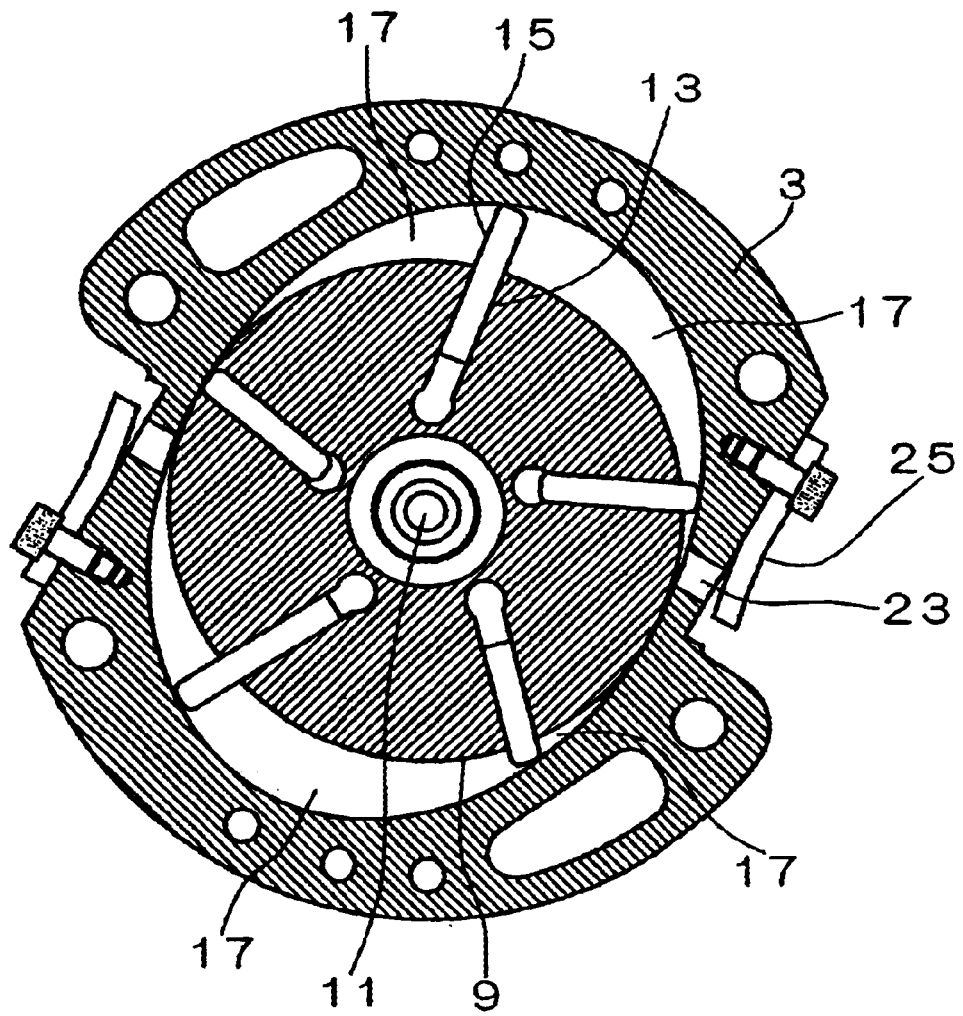
FIG. 6 is a sectional view showing the variable capacity type gas compressor taken along the 6—6 line in FIG. 5.
Figure 7:
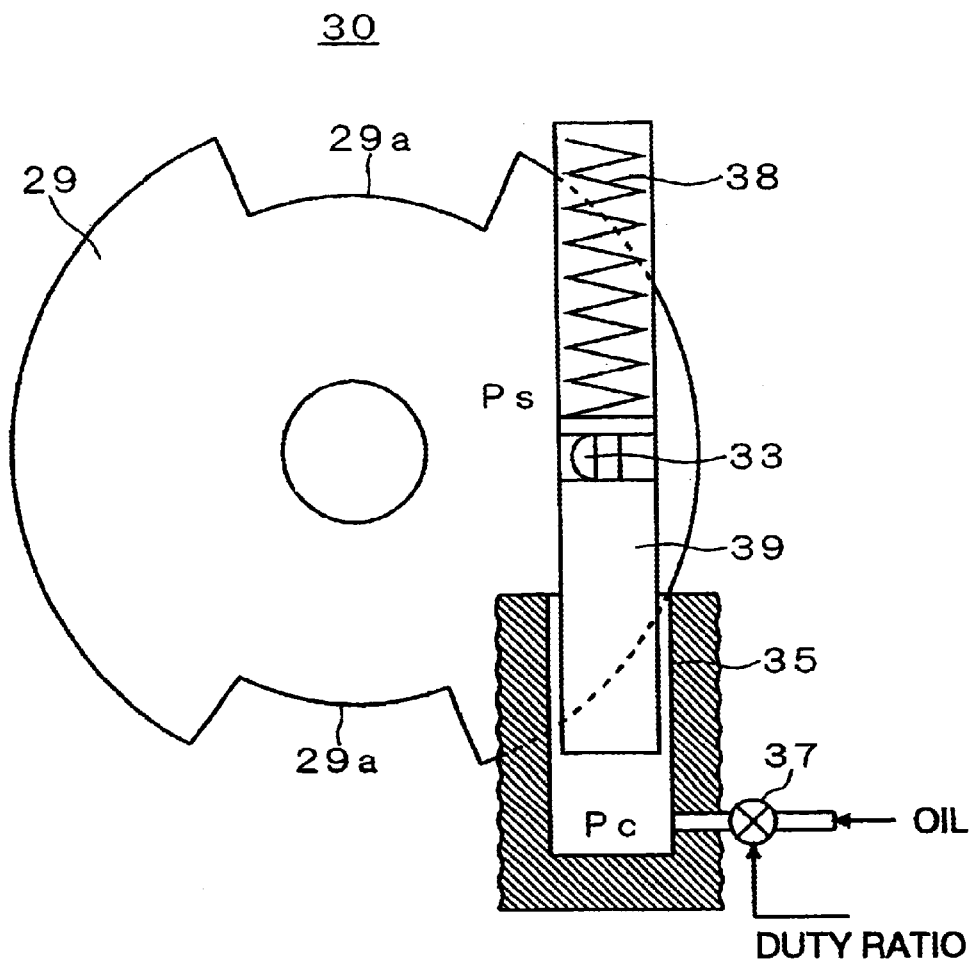
FIG. 7 shows an example of configuration of the variable capacity mechanism.
Figure 8:
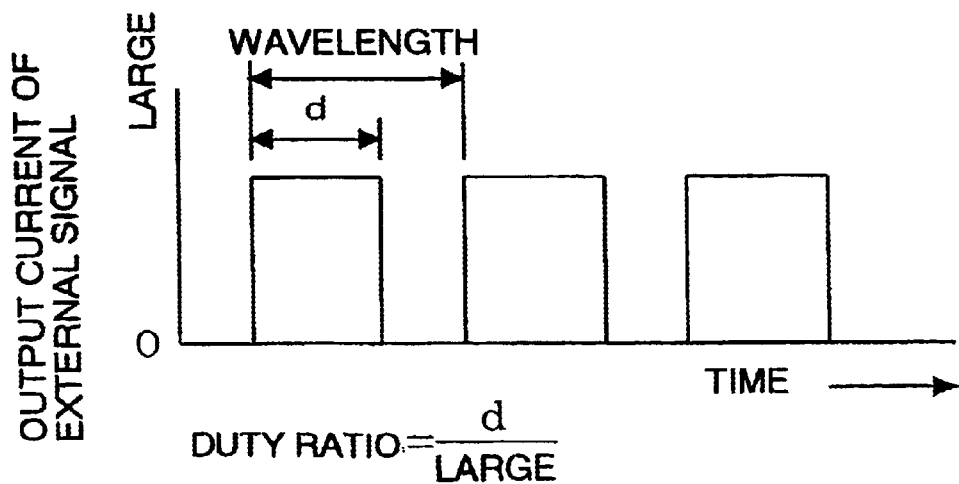
FIG. 8 shows a capacity control instruction value (duty ratio).
Figure 9:
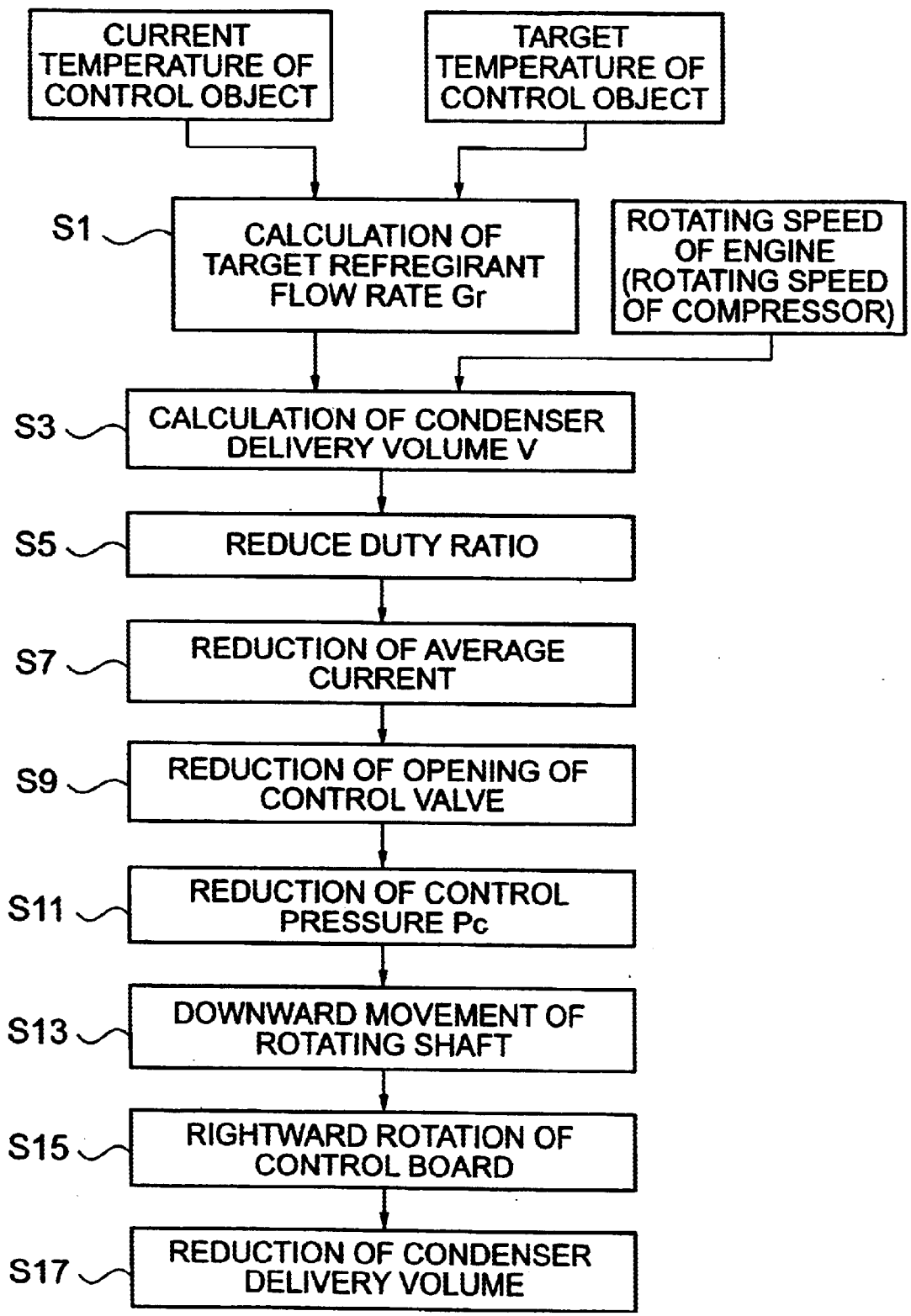
FIG. 9 shows a flowchart.

Next, Embodiment 2 of the present invention will be described. FIG. 3 is a block diagram showing Embodiment 2 of the present invention. There is a difference between Embodiment 2 and Embodiment 1 in that, in Embodiment 2, a pressure sensor 111 is provided instead of the temperature sensor 55 and the control is implemented based on this pressure value.

The pressure sensor 111 is provided, for example, near the inlet 1 of a pipe connecting the variable capacity type gas compressor 10 to the evaporator 51. A target pressure setter 115 is provided inside a car room in order to set this pressure.

With the above configuration, the present invention can also execute a control that is based on the pressure value. Even in this case, the present invention can implement the most appropriate control corresponding to a wide range of the heating load.

As heretofore described, the present invention is configured such that the control unit and the calculation unit of speed revision can be changed according to the target temperature and the target air flow amount. Therefore, the present invention can implement the optimum temperature control even with respect to various heating loads.

What is claimed is:

1. A controlling apparatus for a mode change type refrigerating system comprising:

a variable capacity type gas compressor having a capacity changing means capable of changing a capacity of a compression chamber;

an evaporator for delivering refrigerant drawn into the variable capacity type gas compressor;

a fan for cooling the evaporator;

temperature detecting means for detecting air temperature at a predetermined place desired for controlling temperature;

temperature setting means for setting a target temperature;

deviation calculating means for calculating deviation between the temperature setting means and the temperature detecting means;

temperature controlling means provided with a plurality of control units, each of the control units commonly including a plurality of control elements, in which at least one control element among the plurality of the control elements has a control element value that is different for each control unit, and a first capacity control value is outputted as the result of the calculation based on the control element;

control unit selecting means for selecting one control unit from among the plural control units, and for inputting the deviation calculated by the deviation calculating means to the selected control unit;

means for detecting a number of rotation for detecting a number of rotation of the variable capacity type gas compressor or a number of rotation of a driving apparatus for driving the variable capacity type gas compressor;

air flow amount setting means for setting the air flow amount of the fan;

calculation means of speed revision including a plurality of calculation units of speed revision having mutually different speed revision characteristics and for outputting a second capacity control value as the result of the calculation;

selecting means of calculation unit of speed revision for selecting one calculation unit of speed revision from among the plural calculation units of speed revision, and for inputting the rotation number detected by the means for detecting a rotation number to the calculation unit of speed revision;

mode changing means for changing the control unit in the control unit selecting means and/or the calculation unit of speed revision in the selecting means of the calculation unit of speed revision based on the target temperature set by the temperature setting means and the air flow amount set by the air flow amount setting means; and adding means for adding a first capacity control value and a second capacity control value, and for outputting the added value to the capacity changing means.

2. A controlling apparatus for a mode change type refrigerating system according to claim 1, wherein the speed revision characteristic is represented by using the following relation formula between the second capacity control value and the number of rotation;

capacity control value=a×(number of rotation)$^b$ (a and b are real numbers).

3. A controlling apparatus for a mode change type refrigerating system according to claim 1, wherein the temperature detecting means is composed of a thermistor, and that the air temperature $T_g$ is calculated from an output voltage $T_{av}$ of the thermistor with a following relation formula: $T_g$=c×$T_{sv}$=d (c and d are real numbers).

4. A controlling apparatus for a mode change type refrigerating system comprising:
- a variable capacity type gas compressor having a capacity changing means capable of changing a capacity of a compression chamber;
- an evaporator for delivering refrigerant drawn into the variable capacity type gas compressor;
- pressure detecting means for detecting a refrigerant pressure;
- pressure setting means for setting a target pressure;
- deviation calculating means for calculating deviation between the pressure setting means and the pressure detecting means;
- pressure controlling means provided with a plurality of control units, each of the control units commonly including a plurality of control elements, in which at least one control element among the plurality of the control element has a control element value that is different for each control unit, and first capacity control value is outputted as the result of the calculation based on the control element;
- control unit selecting means for selecting one control unit form among the plural control units, and for inputting the deviation calculated by the deviation calculating means to the selected control unit;
- means for detecting a number of rotation for detecting a number of rotation of the variable capacity type gas compressor or a number of rotation of a driving apparatus for driving the variable capacity type gas compressor;
- air flow amount setting means for setting the air flow amount of the fan;
- calculation means of speed revision including a plurality of calculation units of speed revision having mutually different speed revision characteristics and for outputting a second capacity control value as the result of the calculation;
- selecting means of calculation unit of speed revision for selecting one calculation unit of speed revision from among the plural calculation units of speed revision, and for inputting the rotation number detected by the means for detecting a rotation number to the calculation unit of speed revision;
- mode changing means for changing the control unit in the control unit selecting means and/or the calculation unit of speed revision in the selecting means of the calculation unit of speed revision, based on the target pressure set by the pressure setting means and the air flow amount set by the air flow amount setting means; and
- adding means for adding a first capacity control value and a second capacity control value, and for outputting the added value to the capacity changing means.

5. A controlling method for a controlling apparatus for a mode change type refrigerating system, the controlling apparatus comprising;
- a variable capacity type gas compressor having a capacity changing means capable of changing a capacity of a compression chamber;
- an evaporator for delivering refrigerant drawn into the variable capacity type gas compressor;
- a fan for cooling the evaporator;
- air flow amount setting means for setting the air flow amount of the fan;
- a plurality of control units including common plural control elements, in which at least one control element among the plurality of the control elements has a control element value that is different for each control unit;
- a plurality of calculation units of speed revision having mutually different speed revision characteristics; and
- means for detecting a number of rotation for detecting a number of rotation of the variable capacity type gas compressor or a number of rotation of a driving apparatus for driving the variable capacity type gas compressor,
- wherein the controlling method comprises the steps of:
  - detecting an air temperature at the predetermined place desired for controlling temperature;
  - calculating a deviation between the air temperature and a set target temperature;
  - selecting one control unit from among the plural control units based on the target temperature and the air flow amount set by the air flow amount setting means;
  - inputting the deviation to the control unit;
  - outputting a first capacity control value obtained by the calculation;
  - selecting one calculation unit of speed revision from among the plural calculation units of speed revision based on the target temperature and the air flow amount set by the air flow amount setting means;
  - inputting a number of rotations detected by the means for detecting the number of rotations detected by the means for detecting the number or rotation into the calculation unit of speed revision;
  - outputting a second capacity control value obtained by the calculation;
  - adding the second capacity control value and the first capacity control value; and
  - changing a capacity of the compression chamber based on the added value.

6. A controlling apparatus for a mode change type refrigerating system according to claim 4, wherein the speed revision characteristic is represented by using the following relation formula between the second capacity control value and the number of rotation:

capacity control value=a×(number of rotation)$^b$ (a and b are real numbers).

* * * * *